United States Patent

[15] 3,653,752
[45] Apr. 4, 1972

Wilson

[54] MOTION PICTURE CAMERA
[72] Inventor: Anton Wilson, Yonkers, N.Y.
[73] Assignee: Anton Bauer, Norwalk, Conn.
[22] Filed: Sept. 30, 1970
[21] Appl. No.: 76,960

[52] U.S. Cl. ................................ 352/72, 352/242, 352/243
[51] Int. Cl. .......................................................... G03b 23/02
[58] Field of Search ............... 352/72, 75, 78 R, 243, 242; 95/86

[56] References Cited

UNITED STATES PATENTS 3,078,757  2/1963  Austin et al. ........................... 352/72 X
3,490,833  1/1970  Gottschalk et al. ................... 352/242 X Primary Examiner—Samuel S. Matthews
Assistant Examiner—Richard L. Moses
Attorney—Curtis, Morris & Safford

[57] ABSTRACT

A manually supported motion picture camera having a housing, a viewfinder eyepiece on one side of the housing and an access opening at its top surface through which film may pass along supply and takeup paths of travel has a hollow throat member whose base connector portion is seated in and operably connected to the camera access opening; the throat member includes a rear wall having angularly related wall portions which are located beyond the rear of the camera, one of the wall portions extends generally perpendicularly to the longitudinal axis of the throat and the other wall portion is positioned at an acute angle to the first wall portion and extends toward the camera on the side of the eyepiece; a first magazine adapted to contain film to be supplied to and exposed in the camera is secured to one of the rear wall portions and a second magazine, adapted to takeup film from the camera as it is exposed, is secured to the other of the wall portions in an angular relation to the first film magazine; the magazines extend rearwardly from the camera and throat member to provide a counterbalance force to the weight of the camera when the camera is placed against the shoulder of a photographer during use and the throat member has a plurality of guide rollers rotatably mounted therein at predetermined angularly related positions for guiding the film from the supply magazine through the throat to the camera and for guiding the exposed film from the camera as it is returned through the throat to the takeup magazine.

33 Claims, 9 Drawing Figures

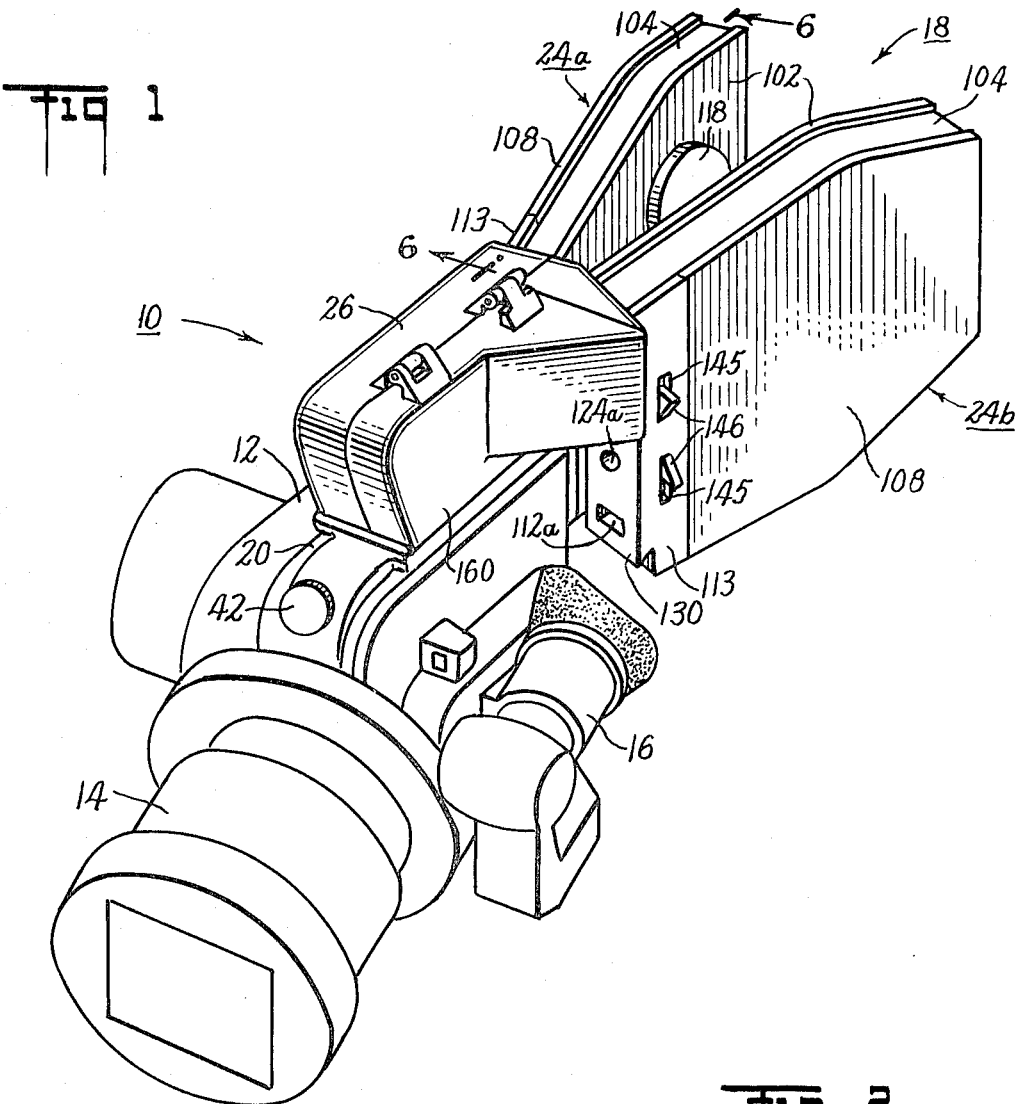
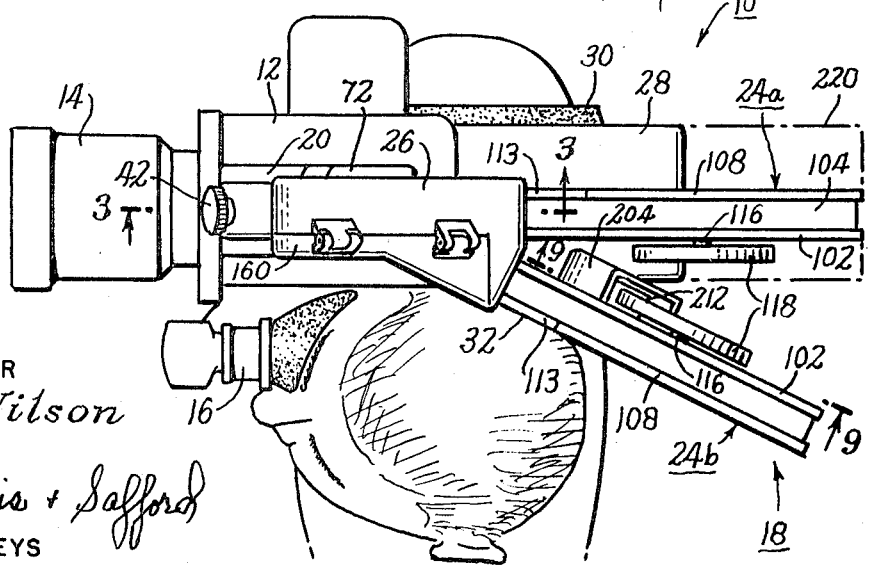

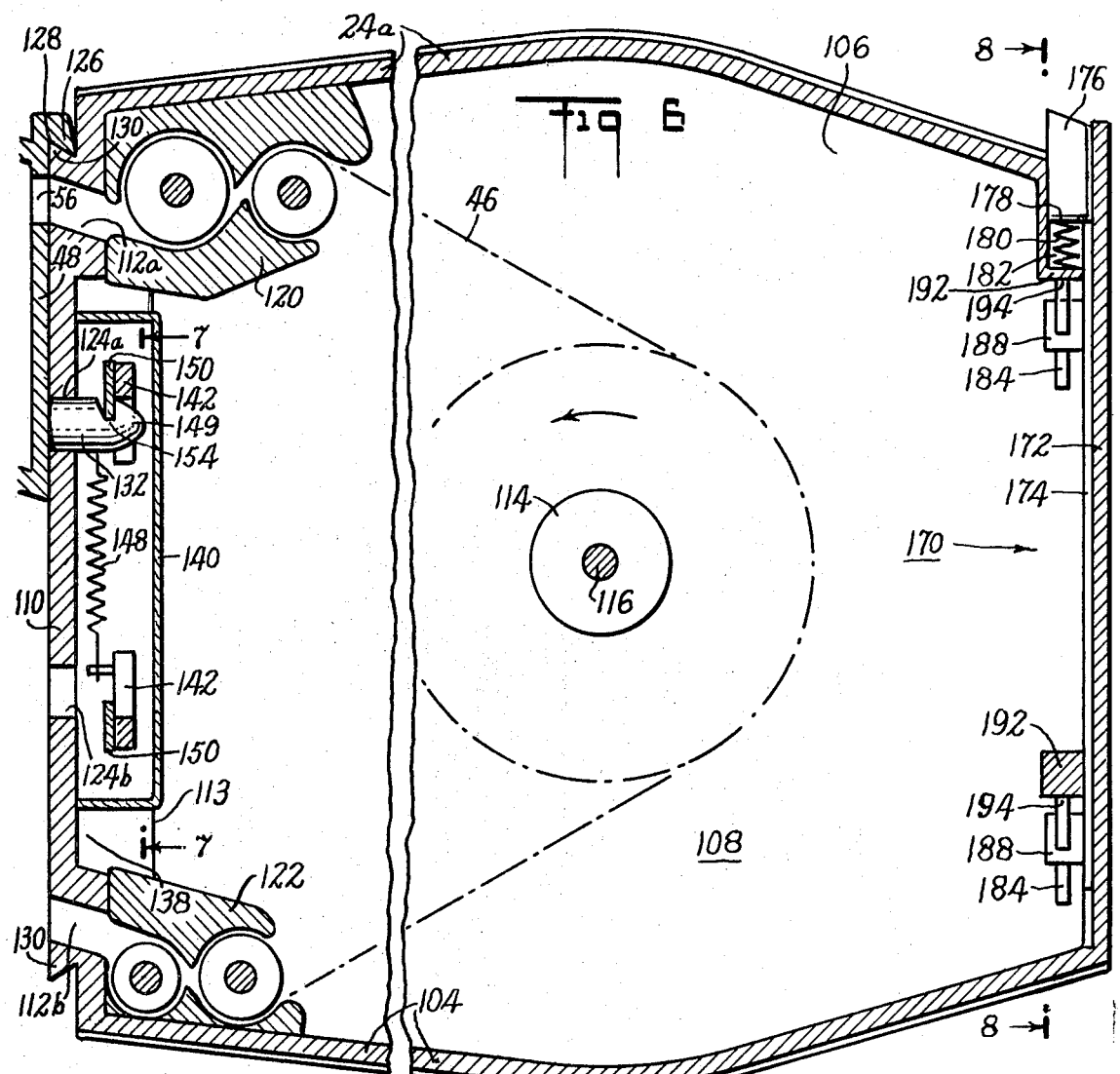
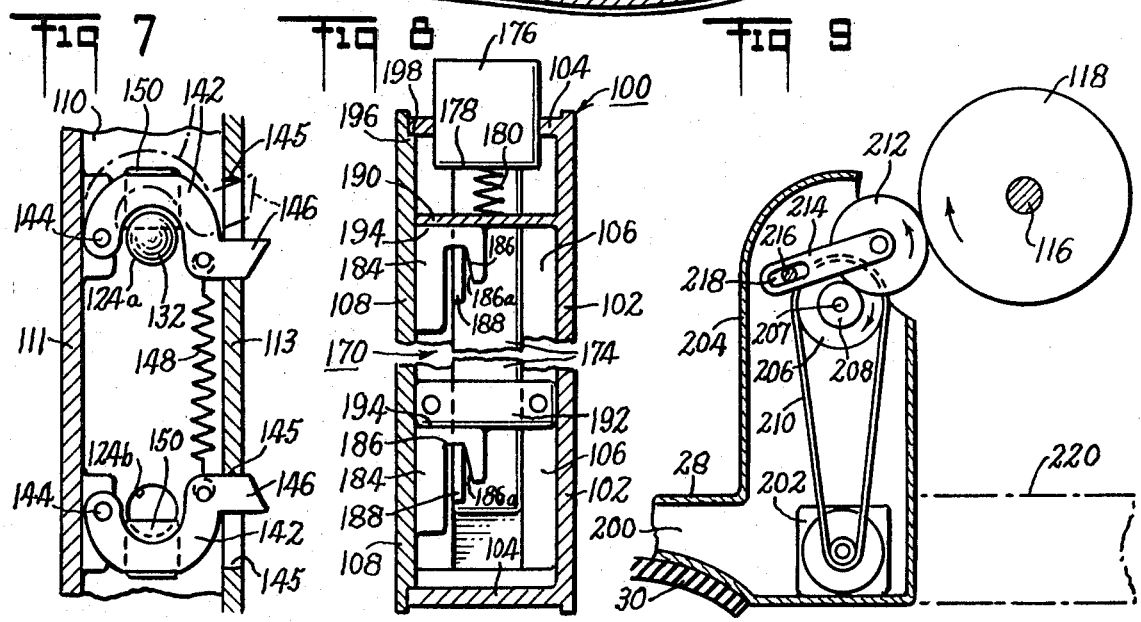

MOTION PICTURE CAMERA

This invention relates to manually held motion picture cameras and more particularly, to a motion picture camera in which the weight of the camera is evenly balanced on the photographer's shoulders.

Motion picture production cameras, of the type generally used for professional cinematography, newsreel and cinema verite, are in large part cameras of substantial weight which are suitably adapted for use with tripods particularly for scanning a moving scene. However, it has become the practice today to use such cameras manually to achieve improved cinemagraphic effects and permit more rapid movement and versatility for the cameraman. To produce acceptable quality motion pictures with manually held cameras of this nature the camera must be held steadily by the photographer; due to the weight of the cameras and film magazines this requires considerable effort on the part of the photographer and causes rapid fatigue.

In previously proposed motion picture cameras of the above type, the camera is supported on the shoulder of the cameraman and substantially all of its weight is forward of the point of contact with the shoulder, all of which must therefore be supported by the cameraman's hands and arms. Moreover, the film magazines attached to these cameras are single magazines having both the supply and takeup reels therein which are secured to the top of the camera, thereby adding the weight of the magazines and the film in front of the point of contact of the camera with the shoulder and increasing the effort required to stabilize the camera. With all of this weight to be supported, the cameraman is rapidly fatigued and has difficulty holding the camera steady, particularly in areas of difficult access or when shooting a shifting scene, for example, when following a crowd or a moving actor. As an additional problem, the position of the film magazine on top of the camera substantially limits the field of vision of the photographer as his vision on the side of the camera beyond the magazines is blocked.

Accordingly, it is an object of the present invention to distribute the weight of a motion picture camera and film magazines to reduce the effort required to support the camera during operation.

It is another object of the present invention to increase the field of view of the photographer utilizing the motion picture camera.

Yet another object of the present invention is to counterbalance the weight of a motion picture camera with the weight of the film magazines therefor so that a minimum effort is required to support the camera on the shoulder of the photographer.

Yet another object of the present invention is to provide motion picture camera accessories and film magazines which are relatively simple in construction and inexpensive to produce.

In accordance with an aspect of the present invention, a hollow throat member is operatively connected to an access opening formed at the top of a motion picture camera housing to provide a path of travel for the film from a supply reel to the camera and a return path of travel for the exposed film from the camera to a takeup reel. The throat member includes a rear wall having first and second angularly related rear wall portions and extends from a point of connection with the camera housing rearwardly along the housing to a position wherein the rear wall is located beyond the rear end of the camera. The first rear wall portion extends generally perpendicularly to the longitudinal axis of the throat and the second rear wall portion of the throat is located at an acute angle to the first portion and extends toward the camera on the side of the camera eyepiece. Each of the rear wall portions includes means for connecting an independent film magazine thereto so that as a result, the film magazines are secured to the throat member and the camera at an angle with respect to each other. A first independent film magazine adapted to contain a supply of film is secured to the first rear wall portion and the film is threaded from the magazine through the throat over a guide roller along a path of travel which extends generally parallel to the longitudinal axis of the throat and is thence directed from the throat into the camera for exposure therein. A second film magazine, adapted to takeup exposed film from the camera is secured to the second rear wall portion and thus is positioned at an angle with respect to the first film magazine. The exposed film from the camera is guided through the throat by a plurality of angularly related guide rollers which incrementally vary the path of travel of the exposed film from the camera towards the second rear wall portion and into the second film magazine.

The film magazines are identical in construction, and are interchangeable one for another. Accordingly, when the first film magazine is emptied, it may be removed from the first wall portion and secured to the second rear wall portion and utilized as the takeup magazine and another magazine containing unexposed film may then be secured to the first rear wall portion so that the photographer may continue.

By this construction the film magazines extend rearwardly of the camera and when the camera is placed on the photographer's shoulder, the magazines are positioned rearwardly of the point of contact with the shoulder and provide a counterbalance force to the weight of the camera, thereby substantially reducing the amount of effort required to support and steady the camera on the photographer's shoulder. In addition, due to the angular relation of the second film magazine to the first film magazine, the second magazine is positioned to contact the side of the photographer's head to further steady the camera and provide an additional control permitting the cameraman to utilize head movements to assist in moving the camera when he is following a moving scene.

The above, and other objects, features and advantages of this invention, will be apparent in the following detailed description of an illustrated embodiment thereof which is to be read in conjunction with the accompanying drawings wherein:

FIG. 1 is a perspective view of a motion picture camera constructed in accordance with one embodiment of the present invention;

FIG. 2 is a plan view of the camera illustrated in FIG. 1, shown in position on the shoulder of a photographer;

FIG. 6 is a sectional view of the film magazine utilized in the present invention, taken on line 6—6 of FIG. 2;

FIG. 7 is a partial sectional view taken on line 7—7 of FIG. 6;

FIG. 8 is a sectional view with parts broken away, taken on line 8—8 of FIG. 6; and FIG. 9 is a partial sectional view taken on line 9—9 of FIG. 2.

Figure 3:
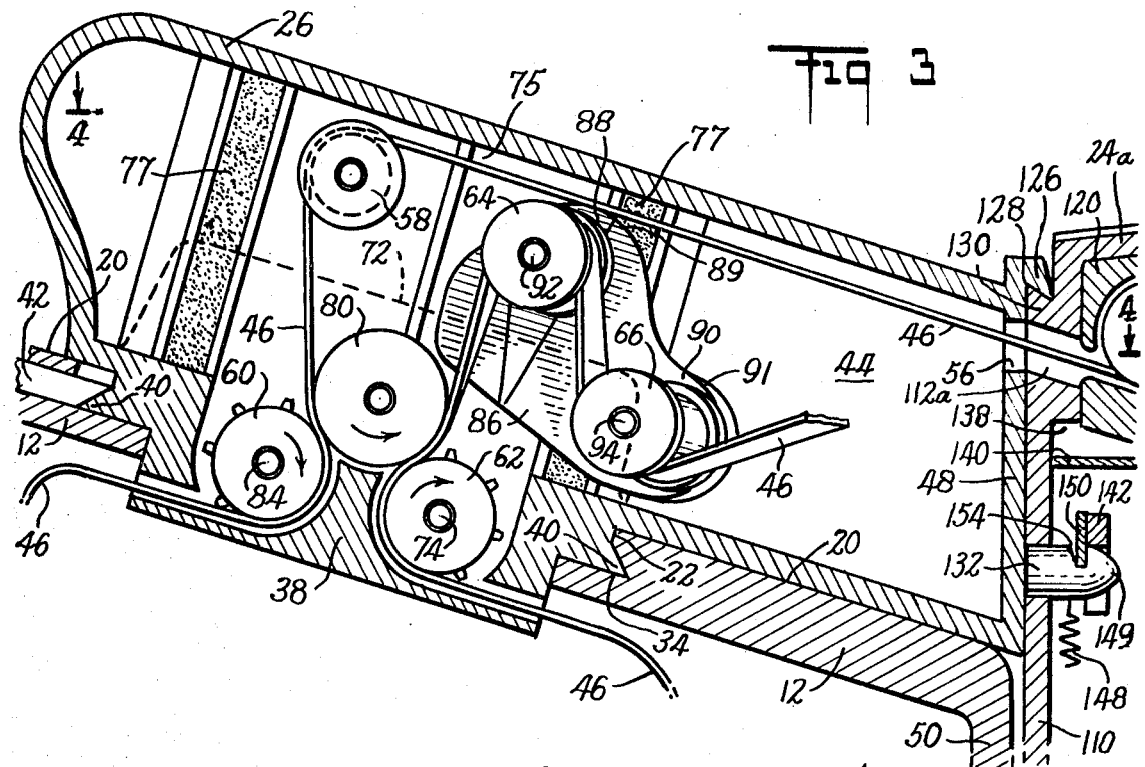
FIG. 3 is a sectional view taken on line 3—3 of FIG. 2.

Referring to the drawings in detail, and initially to FIG. 1 thereof, it will be seen that a motion picture camera 10 embodying the present invention, as shown therein, has a camera body 12 including lens system 14, viewfinder eyepiece 16 and film supply system 18 which contains film supplied for exposure in the camera and also takes up exposed film from the camera. Camera body 12, illustrated in the drawings, is selected as a 16 mm. Arriflex camera distributed by Arriflex Corporation of America, New York City; however, it is noted that this camera is selected for illustrative purposes only and that the present invention may be adapted for use with other well known professional motion picture cameras.

In its conventional operation, the Arriflex camera is provided with a single film magazine having both supply and takeup reels contained therein, which magazine is secured to the top wall 20 of the camera to feed and takeup the film through an access opening 22 therein. However, this construction places all of the weight of the camera and the magazine in front of the cameraman or photographer, thereby making it difficult for the cameraman to control and steady the camera.

Film supply system 18 avoids many of the problems of the previous arrangements since it substantially redistributes the weight of the camera by positioning the film magazines rearwardly of the photographer when the camera is placed on his shoulder. The system includes a pair of identical independent film magazines 24 which are secured to a throat member 26 attached to access opening 22. Throat member 26 encloses the path of travel for the film between film supply magazine 24a to the interior of camera 12 and the path of travel for the exposed film as it is returned from the camera to takeup reel 24b. Member 26 is constructed such that magazines 24 are connected thereto in a generally angular relation. As seen in FIG. 2, magazine 24a is secured to the throat in a position which is substantially in line with the longitudinal axis of the throat whereas magazine 24b is secured to the throat at an angle to the longitudinal axis of the camera and throat and extends toward the side of the camera having the eyepiece 16. In this manner, when the camera is placed on the photographer's shoulder, the magazines are positioned behind the point of contact of the camera with the shoulder and counterbalances the weight of the camera, thereby making the entire assembly easier for the photographer to steady and control.

In the preferred embodiment of the present invention, a support platform 28 is secured to the base of the camera and includes a pad 30 which is contoured (not FIG. 9) to conform to the shape of the shoulder to provide additional stability to the camera. In addition, due to the angular arrangement of magazine 24b, that magazine is in a position to contact the side of the photographer's head at a point, designated 32 in the drawings, so that additional steadying action is provided for the camera. It is noted that by this arrangement a three-point support system is provided, in that the camera is supported on the anatomy of the photographer at the shoulder, at point 32, and at the point of engagement of eyepiece 16 with the surrounding facial area of the photographer. This three-point support system provides a substantial degree of steadying action for the camera and enables the photographer to readily move the camera in a panning action to follow a moving scene. Further, due to the low silhouette of throat 26 the photographer has a substantially expanded field of vision in that he may see over the top of the camera to observe scenes normally outside his field of vision when using cameras constructed in accordance with previously proposed arrangements.

Throat member 26 is secured to camera 12, as seen in FIG. 3, at its top surface 20 at access opening 22; the latter is defined by a peripheral groove 34 formed in top wall 20. Throat member 26 includes a connector portion 38 having a peripheral tongue 40 which is substantially complementary to groove 34 and is adapted to be seated therein. Housing 12 includes a spring biased latch member 42, as is conventional in Arriflex cameras, which engages the forward edge of flange 40 to releasably maintain throat member 26 in connection with the housing. It is noted that access opening 22 is a generally rectangular member and that connector member 38 is also rectangular in construction. However, of course, the particular dimensions and shape of the opening may be varied in accordance with the size and manufacturer of the camera being used.

Throat 26 extends rearwardly from access opening 22 along the top surface of the camera and defines an interior chamber 44 which contains the portion of the paths of travel of film 46 as it is supplied to and taken up from the camera by magazines 24. Rear wall 48 of throat member 26 is positioned beyond read wall 50 of camera 12 and includes a pair of wall portions 52 and 54 to which magazines 24a and 24b are respectively connected. Wall portion 52 extends generally perpendicularly to the longitudinal axis of throat member 26 and has an access opening 56 therein through which film is supplied from magazine 24a into the chamber 44. Film 46 extends from supply magazine 24a along the longitudinal axis of throat member 26 and is guided over roller 58, the latter being rotatably mounted on a horizontally extending axis by bearings (not shown). Roller 58 diverts the path of travel of the film downwardly over guide sprocket 60, mounted in connector portion 38, whereby the film is directed into camera housing 12 for exposure at the gate system (not shown) within the camera in the conventional manner. After exposure in the camera, the film is returned from the gate to connector 38 where it is engaged by a second sprocket 62, similar in construction to sprocket 60, and directed therefrom over a pair of guide rollers 64 and 66 respectively, along a return path of travel to takeup magazine 24b.

Figure 5:
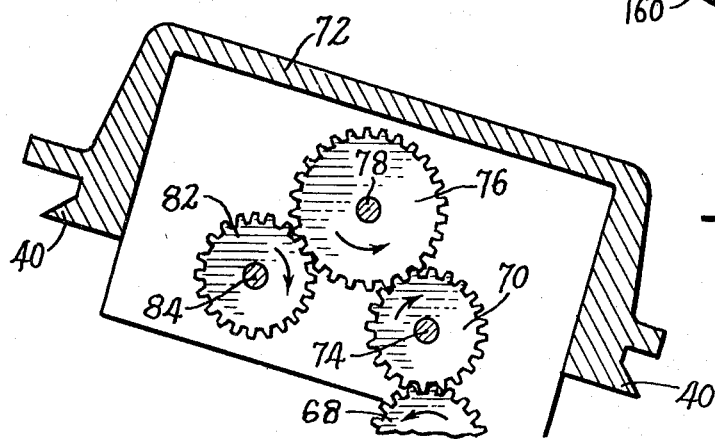
FIG. 5 is a sectional view taken on line 5—5 of FIG. 4.

Sprockets 60 and 62 are driven, and they respectively draw the film from the supply magazine 24a to the camera and the exposed film from the gate to throat 26. These sprockets are driven when the camera is in operation through a gear 68, see FIG. 5, which is provided within housing 12 of the camera and is driven by the camera motor (not shown). Gear 68 is engaged with gear 70 mounted in gear housing portion 72 of throat 26 and secured to a shaft 74 rotatably mounted in the housing. Sprocket 62 is secured to shaft 74 within throat 26 and thus, rotation of gear 70 by gear 68 causes rotation of sprocket 62 in the directions indicated by the arrows in the drawings. An idler gear 76 is also rotatably mounted in gear housing 72 and is positioned for driving engagement with gear 70. Idler 76 is secured to shaft 78 which shaft is fixed in gear housing 72. Yet another gear 82 is mounted in gear housing 72 and is in engagement with idler gear 76. The latter transmits rotation of gears 68 and 70 to gear 82 which is mounted on a common shaft 84 with sprocket 60 so that when gear 82 is rotated by idler 76, sprocket 62 is also rotated. Thus, during operation of the camera, sprocket 60 is rotated in a generally clockwise direction to draw film 46 from magazine 24a over guide roller 58 into camera 36 while simultaneously sprocket 62 draws exposed film from the camera gate through the camera housing into the throat member 26. A guide roller 80, is mounted in connector 38 between sprockets 60 and 62 to insure that the apertures on the side of the film are properly engaged with the sprockets during operation of the device and to assure proper supply and takeup of the film in the camera housing.

Guide roller 58 is mounted on a generally vertically extending plate 75 mounted in throat member 26, by strips 77 of resilient material secured between the edges of plate 75 and throat 26. Strips 77 serve to isolate the plate and the sound producing vibrations caused by rollers 58, 60, 62, 64 and 66 from the rest of the camera to dampen the noise produced thereby. Guide rollers 64 and 66 are mounted on a common plate 86 which is secured to plate 75. Both rollers are rotatably mounted on fixed shafts secured to plate 86 and as seen in the drawings, these rollers are mounted in angularly related positions so as to deflect the path of travel of film 46 in increments and direct the film at an angle to the longitudinal axis of throat 26 whereby the film is returned to the angularly mounted takeup magazine 24b.

Plate 86 is provided with two roller supporting surfaces 88 and 90 respectively which are positioned at a predetermined angular relation to themselves and to throat 26 to provide the incremental deflection of film 46. Surface 88 is positioned at an angle of approximately 13 ½° to the longitudinal axis of throat member 26 and thus positions roller 64, which is rotatably mounted by bearings (not shown) on a shaft 92 extending perpendicularly to surface 88, at a slight angle to the longitudinal axis of throat 26 whereby a slight twist is given to the film as it moves from sprocket 62 to roller 64. Surface 90 of plate 86 is inclined at a greater angle to the longitudinal axis of throat 26 than is surface 88 and this angle is preferably twice the angle formed by surface 88 and the longitudinal axis of throat 26; in the preferred embodiment, therefore, this angle is approximately 27°. Roller 66 is rotatably mounted on bearings (not shown) on a shaft 94 which is positioned rearwardly and below shaft 92 of roller 64. The additional angulation of roller 66 provides an additional deflection of the film from along its path of travel so that as the film leaves roller 66 it is directed along the proper angle to the longitudinal axis of throat 26 so that it will pass through an aperture in rear wall 54 of the throat into takeup magazine 24b.

To further assist in proper deflection of the film in its return path of travel, surfaces 88 and 90 are canted slightly with respect to the vertical, i.e. the upper edge 89 of surface 88 is tilted slightly towards plate 75 so that shaft 92 is directed along a generally upwardly extending line at an angle of approximately 3° from the horizontal whereas the top edge 91 of surface 90 is canted slightly away from plate 75 so that shaft 94 extends downwardly at an angle of approximately 3° from the horizontal. This slight canting of the rollers facilitates the deflection of the film and provides a smooth transition from one section of the path of travel to the next adjacent angularly related section of the path of travel of the film. Further, these angles substantially reduce the possibility of binding of the film on the rollers and the bends formed in the film are purely axially related to the rollers so that no side tension is produced on the film which would cause binding or slippage of the film off of the rollers.

Magazines 24, are identical in construction and are interchangeable; accordingly, only magazine 24a, utilized as the supply reel for the film 46, is illustrated and described in detail. As seen in FIGS. 6 and 8, magazine 24a includes a housing 100 having a base portion 102 and a peripheral side wall 104 thereabout which defines film receiving chamber 106. The latter, open at the side opposite base 102, is closed by a cover plate 108 corresponding substantially in configuration and dimensions to base 102. Front section 110 of peripheral wall 104 is provided with a pair of apertures 112 which are located in a predetermined position so that when the magazine 24 is secured to throat 26, a selected one of the apertures 112 will be in substantial alignment with a corresponding aperture 56 in the associated rear wall portion of throat 26, to permit passage of film between the throat and the magazine. For example, when magazine 24 is used as a supply magazine, as illustrated in FIG. 6, aperture 112a is in alignment with the aperture 56 in rear wall portion 52 of throat 26.

Spool 114 is rotatably mounted on a shaft 116 secured to base portion 102 of the magazine. This spool provides support for a supply or roll of film when the magazine is used as a supply magazine and alternatively the spool is adapted to have exposed film wound thereon when the magazine is used as a takeup reel. Shaft 116 extends through base 102 and has a friction drive wheel 118 secured thereto, to facilitate use of the magazine as a takeup reel, as is more fully described hereinafter. Light traps 120 and 122 are provided adjacent apertures 112a and 112b respectively, and each of these traps include a plurality of laterally offset rollers rotatably mounted on base 102 which serve to prevent light from entering through their associated apertures 112 and exposing or damaging the film contained within the magazines, while simultaneously permitting film 46 to move from within chamber 106 to or from throat 26.

To facilitate operative connection of magazine 24 with throat 26, rear wall 48 is provided with an upper ledged portion 126 having a groove 128 formed therein and front wall 110 of magazine 24 is provided with tongue extension 130 at each end thereof formed in a configuration adapted to mate with groove 128. In addition, each of the rear wall portions 52 and 54 of throat 26 is provided with a notched stud member 132 which is received in a selected one of the apertures 124 formed in front wall 110 of magazine 24 and cooperates with a latching mechanism in the magazine (more fully described hereinafter) to lock the magazines to throat 26.

To attach magazine 24 to one of the adjacent walls 52 and 54 of the throat 26, extension 130 thereof is inserted within groove 128, and stud 132 is moved through one of the apertures 124 in front wall 110, as the magazine is pivoted about tongue 130 into engagement with the associated rear wall portion. The relatively tight mating engagement of stud 132 and aperture 124, and the mating engagement of groove 128 and extension 130, are sufficient to hold the magazines on the throat member 26 during normal operation of the camera. However, a locking system is provided to prevent inadvertent dislocation of the magazine with respect to throat 26 and to avoid possible damage to the film. As seen in FIGS. 6 and 7, front wall 110 is slightly recessed at an intermediate portion 138 thereof, and that portion is enclosed in a generally rectangularly shaped light shield housing 140 which prevents light from entering chamber 106 through apertures 124 and damaging the film contained therein. A pair of latch members 142 are pivotally mounted on pins 144 in a side wall portion 111 of the recessed front wall 110. Latches 142 include finger control pieces 146 which extend through the opposed return portion 113 of cutout section 138 of front wall 110 to the exterior of the magazine where they may be operably engaged by the cameraman. Extensions 146 are interconnected by a spring 148 so that latch members are biased towards each other, however, pivotal movement of the latches towards each other is prevented by engagement of extensions 146 with the edges of the apertures 145 through which they extend. When magazine 24 is inserted against throat 26 the pointed tip 148 of stud 132 engages the locking surface 150 of the associated latch 142 and urges the latch in a counterclockwise direction about pivot pin 144 until the magazine is properly seated against the rear wall 48 of the throat. Stud member 132 includes a groove or notch 154 in which the lever is seated under the influence of spring 148 when the magazine is properly inserted against the rear wall of the throat and the spring member thus serves as a locking device to prevent inadvertent removal of the magazines from the camera.

Figure 4:
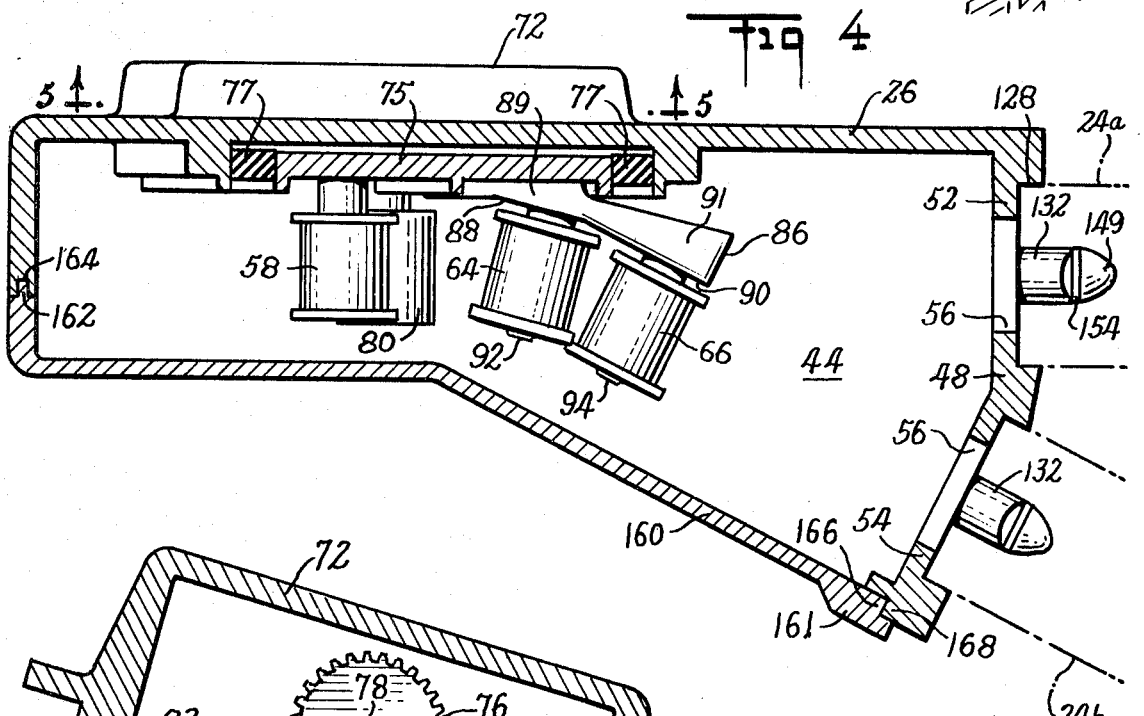
FIG. 4 is a sectional plan view, taken on staggered line 4—4 of FIG. 3.

When a filming operation is completed and all the film previously contained within magazine 24a is exposed and taken up in magazine 24b, magazine 24a may be utilized as the takeup magazine for a fresh supply of film during the next scene shooting operation. To do this, magazine 24b, which is now loaded with exposed film, is removed from the camera by operating the latch 146 and merely pivoting the magazine in a counterclockwise direction about extension 130 to disengage stud 132 and aperture 124b. The magazine may then be stored for later processing of the film. Similarly magazine 24a is removed and is merely inverted, i.e. rotated 180° and inserted at the previous location of magazine 24b. In this case aperture 124b is engaged with the stud 132 on rear wall portion 54 and aperture 112b is seated in alignment with the aperture 56 in that rear wall portion. Thereafter a newly loaded magazine 24a containing a fresh supply of film is connected to wall portion 52 with stud 132 thereof inserted in aperture 124a and aperture 112a in register with aperture 56. Typically, the new magazine includes a leader portion of film which extends through light trap 120 and aperture 112a. This leader film section is inserted through aperture 56 of wall portion 52 prior to connection of the magazine thereto, so that the leader is presented within chamber 44 of throat 26. The latter is provided with a pivotally mounted door 160, so that the interior of chamber 44 may be exposed and the film 46 threaded about a roller 58 and directed to sprocket 60 and the interior of the camera. Similarly the film may be threaded from the camera on its return path of travel over rollers 64 and 66 to magazine 24b in preparation for the filming operation. Door 160 has a tongue 162 along its major portion which is adapted to mate with a groove 164 along the periphery of the remainder of throat 26 to form a light trap which prevents light from entering within chamber 44 and damaging the film contained therein. The right edge 161 of door 160, as seen in FIGS. 1 and 4, has a stepped edge 166 which mates with a stepped edge 168 on rear wall portion 54 to form a light trap at that juncture.

Cover 108 is operably secured to the housing 100 by a latching mechanism 170 secured to the rear section 172 of peripheral wall 104. Latching mechanism 170 includes a slide plate 174 which is mounted for sliding movement in a groove in rear wall 172. Plate 174 includes a fingerpiece 176 having a shoulder portion 178 which is operably engaged by spring 180 seated in recess 182 formed in the wall 104, which spring biases slide member 174 in an upward direction as seen in FIG. 6. Cover 108 includes a pair of hook-shaped latch members 184 having downwardly opening notches 186 formed therein. Notches 186 are adapted to be engaged by extensions 188 formed on slide 174 which serve to hold cover 108 in position against housing 100. Notches 186 have a cammed inner surface 186a which guide extensions 188 to the base of the notches 186 in their associated latch members 184 and cooperate with the extensions to cam against the extensions and thereby tightly hold the cover 108 against the housing.

The biasing action of spring 180 is limited by a pair of stop members 190 and 192 provided within the magazine. The base of recess 182 defines the stop 190 and stop 192 comprises a bar extending across the rear wall 172. The upper surface 194 of latch members 184 engage stop members 190, 192 respectively to limit upward movement of the latches and cover 108 under the influence of the spring 180 as transmitted through extensions 188. This provision of stop members is particularly advantageous since the peripheral edge 196 of the cover 108 is notched to receive the free edge 198 of wall 104 and thereby provide a light trap to prevent light entering chamber 106. Stop members 190 and 192 accurately position cover 108 with respect to housing 100 and wall 104 so that edge 196 is properly positioned with respect to edge 198. If stops 190 and 192 were not provided, only the small edge portion 198 of the light traps about the peripheral edge of the cover would serve to maintain the cover in its position against the influence of spring 180 and it therefore would be possible for the cover to shift vertically with respect to the remainder of the housing, causing an opening or failure of the light trap with resulting disastrous results to the film within the magazine.

In order to take up the exposed film from camera 12, a drive system is provided on support platform 28 for rotating the hub 114 within the takeup magazine 24b. In addition to taking up the film, the drive system maintains the film in its path of travel from sprocket 62 through the throat portion under longitudinal tension and thereby avoids binding of the film and possible breakage thereof as would occur if untensioned film were bent within the throat. Support platform 28 is a generally rectangular hollow member on which the camera 12 is supported and it includes an interior chamber 200 which contains various control components for the camera, including motor 202 at its rear end. Motor 202 is utilized to rotate the spool 114 in the takeup magazine 24b and is drivingly connected, by belt 210, to a pulley 206 mounted in a narrow generally vertically extending housing secured to plate 28. Pulley 206 is secured, with friction drive wheel 208, on a common shaft 207 which is rotatably mounted in housing 204. The latter also includes an additional friction drive wheel 212 which is rotatably mounted on a lever 214 secured to the housing by a pin 216. Lever 214 includes an elongated slot 218 which receives pin 216 and permits a relatively large degree of freedom of movement for the drive wheel 212. When the takeup magazine 24b is positioned adjacent wall 54, its drive wheel 118 is positioned in contact with wheel 212, which in turn, is in engagement with driven wheel 208. Thus, during operation of the device, wheel 118 and thus spool 114, is rotated by the wheel 212 through motor 202. As wheel 212 is held in engagement between the wheels 206 and 118, the relative position thereof with respect to the wheel 208 causes drive wheel 212 to be urged downwardly between wheel 118 and 208, and the rotational forces applied by wheel 208 to wheel 212 hold the wheel in that position.

In addition to containing motor 202, support platform 28 may also provide operative support for a battery pack 220 indicated in dotted lines in FIGS. 2 and 9, which would supply power for the camera and be secured to the platform in any convenient manner. Positioning the battery pack in this manner eliminates the battery carrying belts presently used and adds to the stability and counterbalancing effects of the rearwardly extending magazines.

The use of independent film magazines permits the photographer to carry more loadable film magazines than previously proposed devices since only a single empty reel need be included with his equipment. In the past, the magazines were integral units having a loaded reel and an unloaded reel so that for every loaded reel of film the cameraman had to carry a substantial amount of dead space in the empty reels. By the construction of applicant's device, on the other hand, only a single empty magazine is carried, and the magazines containing unexposed film sequentially serve as takeup reels after their film has been utilized. It is also noted that the construction of the preferred embodiment, and in particular the relatively simple latching system, provides for the possibility of extremely rapid film changes, which may be necessary particularly in producing documentary or newsreel type films. Further, the present invention provides additional advantages when shooting a continuous or developing scene wherein even the small amount of time required to change the film magazines of the present invention may be so long as to possibly cause the cameraman to miss an important development in the scene which he was shooting. In this case it is contemplated that the cameraman carry a spare throat already loaded with the magazines and fully threaded with the film wherein a loop of film is left exposed through the connector portion 38 of the throat. Thus, in the event that the cameraman runs out of film during a particularly important scene, he may simply operate the latch mechanism 42, remove the entire throat magazine assembly in a rapid operation, and replace the entire assembly with the new loaded assembly in a matter of a few seconds, thereby presenting an immediately available supply of fresh film and doubling his shooting time.

It is thus seen that a relatively simple and inexpensive apparatus is provided in which relatively heavy motion picture cameras which are used in manually held operations are counterbalances for ease in handling and supporting the camera during filming. Moreover, the ready interchangeability of the magazines utilized in conjunction with the throat member 26 provides for rapid interchanges of film, thereby increasing the versatility of the camera and freedom of operation of the cameraman.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A manually supported motion picture camera having a housing and a viewfinder eye-piece on one side of said housing, said camera including a hollow throat portion extending rearwardly along said housing to a position adjacent the rear of said housing, a first magazine for containing film to be supplied to said camera, a second magazine for taking up film from said camera as said film is exposed, means for operably connecting said magazines to said throat portion in an angular relation adjacent the rear of said camera, said connecting means maintaining said magazines in generally vertically extending planes intersecting at a point forwardly of said magazines, and means in said throat portion for guiding said film from said first magazine along a first path of travel to said camera for exposure therein, and for guiding the exposed film from said camera, along a second path of travel angularly related to said first path, to said second magazine for storage therein.

2. Apparatus as in claim 1 wherein said first magazine is positioned substantially in alignment with the longitudinal axis of said throat and said second magazine is positioned at an acute angle to said first magazine and located on the same side of said camera as said eyepiece.

3. Apparatus as in claim 1 wherein said guiding means in said throat comprises a plurality of guide rollers, at least one of said rollers guiding said film from said first magazine to said camera and the remainder of said rollers guiding said film from said camera to said second magazine.

4. Apparatus as in claim 1 wherein said guide means in said throat comprises three guide rollers, one of said rollers guiding said film along said first path of travel and the other two of said rollers guiding said film along said second path of travel.

5. Apparatus as in claim 4 wherein said one guide roller is rotatably mounted in said throat on a generally horizontally extending axis, said other two rollers being rotatably mounted in said throat in vertically spaced laterally offset relation wherein the first of said two rollers contacted by said film in said second path of travel is located at a greater vertical distance from said camera housing than the second of said two rollers and the latter roller is located rearwardly in said throat with respect to said first roller, said first roller of said pair being mounted on a generally horizontally extending axis and positioned at an angle to the longitudinal axis of said throat and said second roller of said pair being mounted on a generally horizontally extending axis and positioned at a greater angle to said longitudinal axis than said angle.

6. Apparatus as in claim 5 wherein said throat member includes first and second angularly related and generally vertically extending surfaces, said first roller of said pair being mounted on said first surface and extending generally perpendicularly thereto and said second roller of said pair being mounted on said second surface and extending perpendicularly thereto, said first surface being positioned at a predetermined acute angle to the longitudinal axis of said throat and said second surface being positioned at an angle to said longitudinal axis which is greater than said predetermined angle.

7. Apparatus as in claim 6 wherein said first roller of said pair is tilted upwardly from the horizontal angle of approximately 3° and said second roller of said pair is tilted downwardly from the horizontal approximately 3°.

8. Apparatus as in claim 7 wherein said predetermined angle is approximately 13 ½°.

9. Apparatus as in claim 1 wherein said magazines extend rearwardly of said camera to provide a counterbalance force to the weight of said camera, when the camera is placed against the shoulder of a photographer during use.

10. Apparatus as in claim 9 including a support platform secured to the bottom of said camera and a cushion secured to said platform for engagement with the photographer's shoulder during operation.

11. Apparatus as in claim 1 wherein said magazines are substantially identical in construction and each includes a spool for retaining said film therein, said spools being rotatably mounted in said magazines and including a stub shaft extending through one wall thereof, and means operably connected to said camera for driving the stub shaft and spool of said takeup magazine.

12. In a manually supported motion picture camera including a housing having an access opening at the top surface thereof for passage of film along supply and takeup paths of travel, and a viewfinder eyepiece on one side of said housing, apparatus for supply film to said camera comprising, a hollow throat member having a base connector portion adapted to be seated in and operably connected to said access opening, said throat member including a rear wall having first and second angularly related rear wall portions and extending from said base portion rearwardly along said housing to a position wherein said rear wall is located beyond the rear of said camera, said first rear wall portion extending generally perpendicularly to the longitudinal axis of said throat, said second rear wall portion being positioned at an acute angle to said first portion and extending toward said camera on the side of said eyepiece, a first film magazine for containing film to be supplied to and exposed by said camera, a second film magazine for taking up film from from said camera as it is exposed, means for connecting said first magazine to said first throat wall portion and for connecting said second magazine to said second throat wall portion, said wall portions and said magazines having registering apertures in the paths of travel of said film, and a plurality of guide rollers rotatably mounted in said throat at predetermined angularly related positions for guiding said film from said first magazine through the aperture in said first wall portion, along a first path of travel in said throat to said camera for exposure therein and for guiding the exposed film from said camera, along a second path of travel in said throat, through said aperture in said second wall portion to said second magazine for storage therein.

13. Apparatus as in claim 12 wherein said throat member includes three guide rollers, one of said rollers guiding said film along said first path of travel and being mounted on a generally horizontal axis extending perpendicularly to the longitudinal axis of said throat, the other two of said rollers guiding said film along said second path of travel and being mounted on generally horizontal axes in vertically spaced laterally offset relation wherein the first of said two rollers contacted by said film in said second path of travel being located at a greater vertical distance from said camera housing than the second roller, the latter roller being located rearwardly in said throat with respect to said first roller, the axis of rotation of said first roller of said pair being positioned at a first predetermined angle to the longitudinal axis of said throat and the axis of rotation of said second roller of said pair being positioned at a second predetermined angle to the longitudinal axis of said throat whereby the path of travel of exposed film from said camera to said second magazine is varied in increments to direct the film through said aperture in said second rear wall portion and into said second magazine.

14. Apparatus as in claim 13 wherein said second predetermined angle is larger than said first predetermined angle.

15. Apparatus as in claim 14 wherein said first roller of said pair is tilted upwardly from the horizontal at an angle of approximately 3° and said second roller of said pair is tilted downwardly from the horizontal at an angle of approximately 3°.

16. Apparatus as in claim 12 wherein said magazines extend rearwardly of said camera to provide a counterbalance force to the weight of said camera, when the camera is placed against the shoulder of a photographer during use.

17. Apparatus as in claim 16 including a support platform secured to the bottom of said camera and a cushion secured to said platform for engagement with the photographer's shoulder during operation.

18. Apparatus as in claim 16 wherein said magazines are substantially identical in construction and each includes a spool for retaining said film therein, said spools being rotatably mounted in said magazines and including a stub shaft extending through one wall thereof, and means operably connected to said camera for driving the stud shaft and spool of said takeup magazine.

19. Apparatus as in claim 12 wherein said means for connecting said magazines to rear wall portions comprises a rearwardly extending notched stud member secured to each of said wall members, said magazines including a front wall portion having an aperture therein for respectively receiving said studs, and spring biased latch mounted on each of said magazines adjacent said stud receiving aperture for engaging the notched portion of a stud inserted therein to retain the respective magazines on said throat member.

20. Apparatus as in claim 12 wherein said magazines are substantially identical in construction and have two vertically spaced stud receiving apertures in said front wall and a spring biased latch member associated with each of said stud receiving apertures whereby said magazines may be secured to either of said wall portions to selectively function as both supply and takeup reels.

21. In a manually supported moving picture camera including a housing having an access opening at the top surface thereof for passage of film between a pair of vertically extending angularly related magazines at the rear of the camera and along supply and takeup paths of travel, apparatus for connecting said magazines to said camera and guiding said film along said paths of travel comprising, a hollow throat member having a base connector portion adapted to be seated in and operably connected to said access opening in said camera housing, said throat member extending rearwardly along said housing from said access opening to a position adjacent the rear end of said housing, said throat member having a vertically extending rear wall positioned beyond the rear end of said camera, means for connecting said magazines to said throat member in said angular relation, and means in said throat portion for guiding said film from said first magazine along said supply path of travel to said camera for exposure therein and for guiding the exposed film from said camera along said takeup path of travel to said second magazine for storage therein.

22. Apparatus as in claim 21 wherein said guiding means in said throat comprises a plurality of guide rollers, at least one of said rollers guiding said film from said first magazine to said camera and the remainder of said rollers guiding said film from said camera to said second magazine.

23. Apparatus as in claim 21 wherein said throat member includes first and second angularly related and generally vertically extending surfaces and said guiding means in said throat member comprises three guide rollers, one of said rollers guiding said film along said first path of travel being mounted on a generally horizontal axis extending perpendicularly to the longitudinal axis of said throat, the other two of said rollers guiding said film along said second path of travel and being mounted respectively on said first and second angularly related surfaces along generally horizontally extending axes in vertically spaced laterally offset relation wherein the first of said two rollers contacted by said film in said second path of travel is located at a greater vertical distance from said camera housing than the second roller and the latter roller is located rearwardly in said throat with respect to said first roller, said first vertically extending surface being positioned at a first predetermined angle to the longitudinal axis of said throat and said second vertically extending surface being positioned at a second predetermined angle to the longitudinal axis of said throat whereby said first and second rollers are angularly related and the path of travel of exposed film from said camera to said second magazine is varied in increments to direct the film through said aperture in said second rear wall portion and into said second magazine.

24. Apparatus as in claim 23 wherein said second predetermined angle is twice said first predetermined angle.

25. Apparatus as in claim 24 wherein said first predetermined angle is 13 ½°.

26. Apparatus as in claim 25 wherein said first roller of said pair is tilted upwardly from the horizontal at an angle of approximately 3° and said second roller of said pair is tilted downwardly from the horizontal at an angle of approximately 3°.

27. Apparatus as in claim 21 wherein said first and second angularly related surfaces are defined by a common plate member adjacent one longitudinally extending wall of said throat.

28. Apparatus as in claim 27 including means for resiliently mounting said common plate in said throat whereby vibrations produced by said rollers are isolated therefrom.

29. Apparatus as in claim 21 including a pair of film guide sprockets mounted in said base connector portion for guiding said film between said camera and said guiding means.

30. Apparatus as in claim 29 including means adapted to be operably connected to said camera for rotating said sprockets.

31. Apparatus as in claim 23 wherein said throat member includes door means for selectively providing access to the interior of said throat to facilitate threading said film over said rollers.

32. Apparatus as in claim 31 wherein said door comprises a pivotally mounted wall portion of said throat member.

33. Apparatus as defined in claim 1 wherein said throat portion is removably mounted on said housing.

* * * * *